United States Patent
Kuribara et al.

(10) Patent No.: US 10,384,547 B2
(45) Date of Patent: Aug. 20, 2019

(54) VEHICLE

(71) Applicant: TOYOTA JIDOSHA KABUSHIKI KAISHA, Toyota-shi, Aichi-ken (JP)

(72) Inventors: Fumiyoshi Kuribara, Toyota (JP); Shigetaka Asano, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/811,996

(22) Filed: Nov. 14, 2017

(65) Prior Publication Data
US 2018/0134163 A1 May 17, 2018

(30) Foreign Application Priority Data
Nov. 17, 2016 (JP) ................................ 2016-223966

(51) Int. Cl.
*B60L 8/00* (2006.01)
*B60L 15/00* (2006.01)
(Continued)

(52) U.S. Cl.
CPC ............ *B60L 8/003* (2013.01); *B60L 15/007* (2013.01); *B60L 50/51* (2019.02); *B60L 50/64* (2019.02); *B60L 53/00* (2019.02); *B60L 53/12* (2019.02); *B60L 53/14* (2019.02); *B60L 53/16* (2019.02); *B60L 53/38* (2019.02); *H02J 7/35* (2013.01); *B60L 2210/14* (2013.01); *B60L 2210/30* (2013.01); *B60L 2210/40* (2013.01); *B60L 2220/14* (2013.01); *B60L 2260/26* (2013.01); *H02J 7/345* (2013.01); *H02P 27/06* (2013.01);
(Continued)

(58) Field of Classification Search
CPC ............... B60L 11/1816; B60L 11/182; B60L 2210/30; B60L 2210/40; B60L 11/1842; B60L 15/007; B60L 11/1809; B60L 11/1803; B60L 11/1818; B60L 11/1879; B60L 8/003; B60L 11/18; B60L 11/1811
See application file for complete search history.

(56) References Cited

U.S. PATENT DOCUMENTS 9,821,666 B2 * 11/2017 Maeno .................... B60K 16/00
2009/0289594 A1 * 11/2009 Sato ........................... G05F 1/67
320/101
(Continued)

FOREIGN PATENT DOCUMENTS

EP    1 153 787 A2    11/2001
EP    2 752 329 A1    7/2014
(Continued)

*Primary Examiner* — Thai T Dinh
(74) *Attorney, Agent, or Firm* — Finnegan, Henderson, Farabow, Garrett & Dunner, LLP

(57) ABSTRACT

A vehicle is equipped with a power storage device configured to transmit electric power to and from a motor for driving, and a solar power generation system configured to generate electric power using sunlight and to perform solar charging that charges the power storage device with the generated electric power. The vehicle is configured to perform external charging that charges the power storage device with electric power from an external power supply apparatus. The vehicle prohibits the solar charging until a standby time has elapsed since an off operation of an ignition switch and permits the solar charging when the standby time has elapsed.

6 Claims, 4 Drawing Sheets

(51) Int. Cl.
  *H02J 7/35* (2006.01)
  *B60L 53/14* (2019.01)
  *B60L 53/16* (2019.01)
  *B60L 50/51* (2019.01)
  *B60L 53/00* (2019.01)
  *B60L 53/12* (2019.01)
  *B60L 53/38* (2019.01)
  *B60L 50/64* (2019.01)
  *H02J 7/34* (2006.01)
  *H02P 27/06* (2006.01)

(52) U.S. Cl.
  CPC ........ *Y02T 10/7005* (2013.01); *Y02T 10/7072* (2013.01); *Y02T 10/7083* (2013.01); *Y02T 10/7094* (2013.01); *Y02T 10/92* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 2012/0133322 A1* | 5/2012 | Walsh | B60L 8/00 320/101 |
| 2013/0124005 A1* | 5/2013 | Ichikawa | H04L 25/028 701/1 |
| 2013/0320911 A1* | 12/2013 | Kamiya | H02J 7/35 320/101 |
| 2014/0002023 A1* | 1/2014 | Ichikawa | B60L 11/1812 320/109 |
| 2016/0089986 A1* | 3/2016 | Maeno | B60K 16/00 320/101 |

FOREIGN PATENT DOCUMENTS

| | | |
|---|---|---|
| EP | 2 937 242 A1 | 10/2015 |
| JP | 2005-295697 A | 10/2005 |
| JP | 2015-57009 | 3/2015 |

\* cited by examiner

VEHICLE

CROSS-REFERENCE TO RELATED APPLICATION

This application claims priority to Japanese Patent Application No. 2016-223966 filed 17 Nov. 2016, the contents of which is incorporated herein by reference.

TECHNICAL FIELD

The present disclosure relates to a vehicle.

BACKGROUND

A proposed vehicle includes a power storage device configured to transmit electric power to and from a motor generator for driving, a solar power generation system configured to generate electric power using the sunlight and connected with the power storage device via a power line, and a charging device configured to charge the power storage device with electric power from an external power supply apparatus (as described in, for example, JP 2015-57009A).

CITATION LIST

Patent Literature

PTL 1: JP2015-057009A

SUMMARY

The vehicle described above may perform external charging that charges the power storage device with electric power from the external power supply apparatus after an off operation of an ignition switch. The vehicle may also perform solar charging that charges the power storage device with electric power from the solar power generation system after an off operation of the ignition switch. Starting the external charging during execution of the solar charging after an off operation of the ignition switch is likely to cause a problem, for example, a failure in adequately controlling the charging electric power of the power storage device. A possible countermeasure may prohibit the external charging during execution of the solar charging. This, however, fails to respond to the driver's request for external charging.

A vehicle of the present disclosure mainly aims to suppress external charging from being started during execution of solar charging.

In order to achieve the above primary object, the vehicle of the disclosure is implemented by an aspect described below.

The present disclosure is directed to a vehicle. The vehicle including a power storage device configured to transmit electric power to and from a motor for driving, a solar power generation system configured to generate electric power using sunlight and to perform solar charging that charges the power storage device with the generated electric power, and a control device configured to control the solar power generation system. The vehicle is configured to perform external charging that charges the power storage device with electric power from an external power supply apparatus. The control device prohibits the solar charging until a standby time has elapsed since an off operation of an ignition switch and permits the solar charging when the standby time has elapsed.

The vehicle of this aspect prohibits the solar charging until the standby time has elapsed since an off operation of the ignition switch and permits the solar charging when the standby time has elapsed. The "standby time" is preferably a time period set to be slightly longer than the time duration when external charging is likely to start after an off operation of the ignition switch and may be, for example, 9 minutes, 10 minutes or 11 minutes. Prohibiting the solar charging until elapse of the standby time since an off operation of the ignition switch suppresses the external charging from being started during execution of the solar charging. Additionally, this configuration allows for execution of the external charging when the driver gives an instruction to (desires to) perform the external charging during prohibition of the solar charging.

DESCRIPTION OF EMBODIMENTS

The following describes aspects of the present disclosure with reference to some embodiments.

Embodiment

Figure 1:
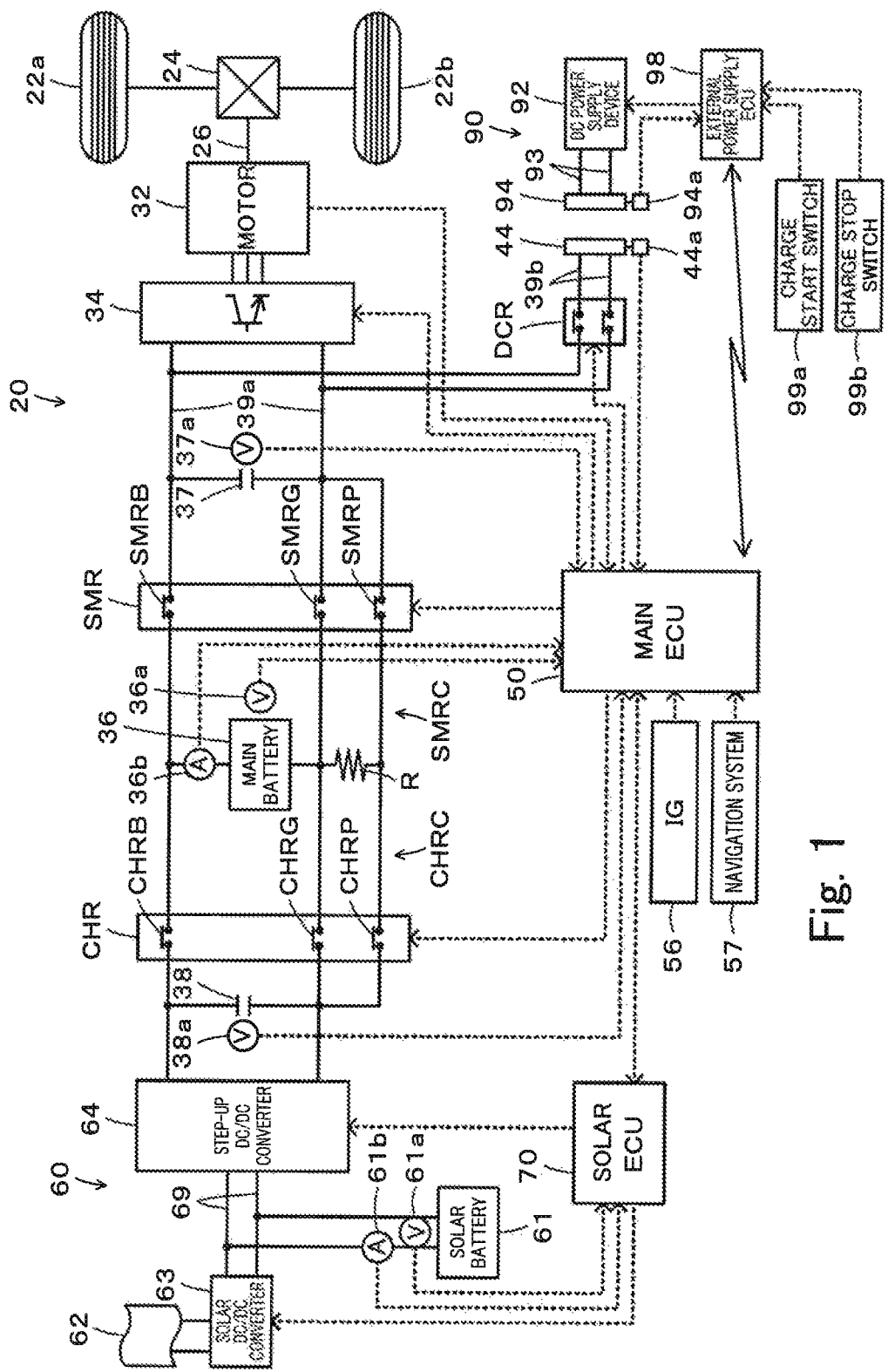
FIG. 1 is a configuration diagram illustrating the schematic configuration of an electric vehicle according to one embodiment of the present disclosure.

FIG. 1 is a configuration diagram illustrating the schematic configuration of an electric vehicle 20 according to one embodiment of the present disclosure. As illustrated, the electric vehicle 20 of the embodiment is configured to include a motor 32, an inverter 34, a main battery 36 as a power storage device, a system main relay SMR, a charging relay CHR, a vehicle-side connector 44, a charging relay DCR, a main electronic control unit (hereinafter referred as "main ECU") 50, a navigational system 57, a solar power generation system 60, and a solar power generation electronic control unit (hereinafter referred as "solar ECU") 70.

The motor 32 is configured as, for example, a synchronous generator motor and is connected with a driveshaft 26 that is coupled with drive wheels 22a and 22b via a differential gear 24. The inverter 34 is used to drive the motor 32 and is connected with power lines 39a. The motor 32 is rotated and driven by switching control of a plurality of switching elements (not shown) included in the inverter 34 by the main ECU 50. The main battery 36 is configured as, for example, a lithium ion rechargeable battery or a nickel metal hydride battery having a rated voltage of 200 V or 250 V and is connected with the power lines 39a. A capacitor 37 is placed between the main battery 36 and the inverter 34 on the power lines 39a, and a capacitor 38 is placed between the main battery 36 and a step-up DC/DC converter 64 of the solar power generation system 60 on the power lines 39a.

The system main relay SMR is provided between the main battery 36 and the inverter 34 along with the capacitor 37 on the power lines 39a. This system main relay SMR is configured to include a positive electrode-side relay SMRB provided on a positive electrode-side line of the power lines 39a, a negative electrode-side relay SMRG provided on a negative electrode-side line of the power lines 39a, and a precharge circuit SMRC including a precharge resistance R and a precharge relay SMRP that are connected in series such as to bypass the negative electrode-side relay SMRG. The precharge circuit SMRC herein denotes a circuit configured to charge (precharge) the capacitor. 37 prior to switching-on of the positive electrode-side relay SMRB and the negative electrode-side relay SMRG when the power is supplied from the main battery 36 to the inverter 34. The system main relay SMR is controlled on and off by the main ECU 50 to connect and disconnect the main battery 36-side with and from the inverter 34 and the capacitor 37-side.

The charging relay CHR is provided between the main battery 36 and the step-up DC/DC converter 64 of the solar power generation system 60 along with the capacitor 36 on the power lines 39a. This charging relay CHR is configured to include a positive electrode-side relay CHRB provided on the positive electrode-side line of the power lines 39a, a negative electrode-side relay CHRG provided on the negative electrode-side line of the power lines 39a, and a precharge circuit CHRC including the precharge resistance R and a precharge relay CHRP that are connected in series such as to bypass the negative electrode-side relay CHRG. The precharge circuit CHRC herein denotes a circuit configured to charge (precharge) the capacitor 38 prior to switching-on of the positive electrode-side relay CHRB and the negative electrode-side relay CHRG when the main battery 36 is charged with electric power from the solar power generation system 60. The precharge resistance R is shared by the precharge circuit SMRC and the precharge circuit CHRC. The charging relay CHR is controlled on and off by the main ECU 50 to connect and disconnect the main battery 36-side with and from the step-up DC/DC converter 64 and the capacitor 38-side.

The vehicle-side connector 44 is connected with the inverter 34 and the capacitor 37-side of the system main relay SMR on the power lines 39a via the charging relay DCR and power lines 39b. This vehicle-side connector 44 is configured to be connectable with a power supply-side connector 94 of an external power supply apparatus 90 at a charging point such as at home or at a charging station. The charging relay DCR is controlled on and off by the main ECU 50 such as to connect and disconnect the power lines 39a with and from the power lines 39b.

The following describes the external power supply apparatus 90 with interruption of the description of the electric vehicle 20. The external power supply apparatus 90 is configured to include a DC power supply device 92, the power supply-side connector 94 connected with the DC power supply device 92 via power lines 93, and an electronic control unit (hereinafter referred as "external power supply ECU") 98 configured to control the DC power supply device 92. The DC power supply device 92 is configured to include an AC power supply, such as a household power supply or an industrial power supply; and a converter configured to convert an AC power from the AC power supply to a DC power and supply the DC power to the power supply-side connector 94-side (electric vehicle 20). The power supply-side connector 94 is configured to be connectable with the vehicle-side connector 44 of the electric vehicle 20. The external power supply ECU 98 is configured as a CPU-based microprocessor and includes a ROM configured to store processing programs, a RAM configured to temporarily store data, input/output ports and a communication port, in addition to the CPU, although not being illustrated. Signals from various sensors are input into the external power supply ECU 98 via the input port. The signals input into the external power supply ECU 98 include, for example, a connection detection signal from a connection detection sensor 94a mounted to the power supply-side connector 94 and configured to detect the connection between the power supply-side connector 94 and the vehicle-side connector 44, a charge start instruction signal from a charge start switch 99a operated by an operator to start DC external charging that charges the main battery 36 with electric power from the DC power supply device 92 of the external power supply apparatus 90, and a charge stop instruction signal from a charge stop switch 99b operated by the operator to stop the DC external charging. The input signals also include a voltage Vps of the power lines 93 from a voltage sensor mounted to the power lines 93 that are arranged to connect the DC power supply device 92 with the power supply-side connector 94, and an electric current Ips of the power lines 93 from a current sensor mounted to the power lines 93. For example, control signals to the DC power supply device 92 are output from the external power supply ECU 98 via the output port. The external power supply ECU 98 is configured to communicate with the main ECU 50 of the electric vehicle 20.

The description of the electric vehicle 20 is resumed below. The navigation system 57 includes a main body with a built-in controller that includes a storage medium such as a hard disk configured to store map information and the like, input-output ports and a communication port; a GPS antenna configured to receive information regarding the current location of the vehicle; and a touch panel-type display configured to display various information including the information regarding the current location of the vehicle and a driving route to a destination and to enter various instructions by the operator. The map information herein includes service information (for example, tourism information, parking places and charging stations) and road information of predetermined drive sections (for example, sections between traffic lights and sections between intersections) that are stored in the form of a database. The road information includes distance information, road width information, lane number information, district information (urban district or suburban district), road type information (general road or express way), gradient information, legal speed limit information and the number of traffic lights. When the operator sets a destination, the navigation system 57 serves to search for a driving route from the current location of the vehicle to the destination, based on the map information, the current location of the vehicle and the destination, to output the searched driving route on the display, and to perform a route guidance. This navigation system 57 also serves to compute route information (for example, the remaining distance to the destination and the direction of the destination) of the driving route. The navigation system 57 is connected with the main ECU 50 via respective communication ports.

The main ECU 50 is configured as a CPU-based microprocessor and includes a ROM configured to store processing programs, a RAM configured to temporarily store data, input/output ports and a communication port, in addition to the CPU, although not being illustrated. Signals from various sensors are input into the main ECU 50 via the input port. The signals input into the main ECU 50 include, for example, a rotational position θm of a rotor of the motor 32 from a rotational position sensor configured to detect the rotational position of the rotor of the motor 32, a voltage Vmb of the main battery 36 from a voltage sensor 36a mounted between terminals of the main battery 36, an electric current Imb of the main battery 36 from a current sensor 36b mounted to an output terminal of the main battery 36, and a temperature Tmb of the main battery 36 from a temperature sensor mounted to the main battery 36. The input signals also include a voltage VL1 of the capacitor 37 from a voltage sensor 37a mounted between terminals of the capacitor 37 and a voltage VL2 of the capacitor 38 from a voltage sensor 38a mounted between terminals of the capacitor 38. The input signals additionally include a connection detection signal from a connection detection sensor 44a mounted to the vehicle-side connector 44 and configured to detect the connection between the vehicle-side connector 44 and the power supply-side connector 94. Furthermore, the input signals include an ignition signal from an ignition switch 56, a shift position from a shift position sensor, an accelerator position from an accelerator pedal position sensor, a brake pedal position from a brake pedal position sensor and a vehicle speed from a vehicle speed sensor. Various controls signals are output from the main ECU 50 via the output port. The signals output from the main ECU 50 include, for example, control signals to the inverter 34, control signals to the system main relay SMR, control signals to the charging relay CHR, and control signals to the charging relay DCR. The main ECU 50 calculates a state of charge SOCmb of the main battery 36, based on an integrated value of the electric current Imb of the main battery 36 input from the current sensor 36b. The main ECU 50 is connected with the navigation system 57 and with the solar ECU 70 via respective communication ports. The main ECU 50 is also configured to communicate with the external power supply ECU 98 of the external power supply apparatus 90 at a charging point such as at home or at a charging station.

The solar power generation system 60 includes a solar battery 61, a solar panel 62, a solar DC/DC converter 63 and a step-up DC/DC converter 64. The solar battery 61 is configured as, for example, a nickel metal hydride battery having a rated voltage of 20V or the like and is connected with the power lines 69. The solar panel 62 is placed on, for example, the roof of the vehicle to generate electric power using the sunlight. The solar DC/DC converter 63 is connected with the solar panel 62 and with the power lines 69. This solar DC/DC converter 63 is controlled by the solar ECU 70 to supply the electric power generated by the solar panel 62 with a change in voltage to the power lines 69 (to accumulate electric power in the solar battery 61). The step-up DC/DC converter 64 is connected with the power lines 69 and with the power lines 39a. This step-up DC/DC converter 64 is controlled by the solar ECU 70 to boost the voltage of the electric power of the power lines 69 and supply the electric power of the boosted voltage to the power lines 39a.

The solar ECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the solar ECU 70 via the input port. The signals input into the solar ECU 70 include, for example, a voltage Vsb of the solar battery 61 from a voltage sensor 61a mounted between terminals of the solar battery 61 and an electric current Isb of the solar battery 61 from a current sensor 61b mounted to an output terminal of the solar battery 61. Various control signals are output from the solar ECU 70 via the output port. The signals output from the solar ECU 70 include, for example, control signals to the solar DC/DC converter 63 and control signals to the step-up DC/DC converter 64. The solar ECU 70 calculates a state of charge SOCsb of the solar battery 61, based on an integrated value of the electric current Isb of the solar battery 61 from the current sensor 61b. The solar ECU 70 is connected with the main ECU 50 via respective communication ports as described above.

In the electric vehicle 20 of the embodiment having the above configuration, when the driver turns on the ignition switch 56, the main ECU 50 switches on the system main relay SMR to set the electric vehicle 20 in the "ready-on" state (i.e., to make the electric vehicle 20 ready for driving). In the connection process to switch on the system main relay SMR, the main ECU 50 switches on the positive electrode-side relay SMRB and the precharge relay SMRP to precharge (charge) the capacitor 37 and subsequently switches on the negative electrode-side relay SMRG and switches off the precharge relay SMRP. Switching on the positive electrode-side relay SMRB and the precharge relay SMRP forms a closed circuit by a positive electrode of the main battery 36, the positive electrode-side relay SMRB, the capacitor 37, the precharge relay SMRP, the precharge resistance R and a negative electrode of the main battery 36, so as to trigger precharge (charging) of the capacitor 37. When the driver turns off the ignition switch 56 after that, the main ECU 50 switches off the system main relay SMR to set the electric vehicle 20 in the "ready-off" state.

In the electric vehicle 20 of the embodiment, when the operator (for example, driver) connects the vehicle-side connector 44 with the power supply-side connector 94 of the external power supply apparatus 90 in the OFF state of the ignition switch 56 and operates the charge start switch 99a at a charging point such as at home or at a charging station, the external power supply ECU 98 sends a signal indicating the connection and the operation to the main ECU 50. When receiving this signal, the main ECU 50 switches on the system main relay SMR. The connection process of the system main relay SMR is described above. The external power supply ECU 98 confirms that the system main relay SMR is ON by communication with the main ECU 50 and then sends an ON request for the charging relay DCR to the main ECU 50. When receiving this request, the main ECU 50 switches on the charging relay DCR. The external power supply ECU 98 confirms that the charging relay DCR is ON by communication with the main ECU 50 and then controls the DC power supply device 92 to start external DC charging. When the charge stop switch 99b is operated or when the external power supply ECU 98 receives a signal indicating that the main battery 36 is fully charged (more specifically, the voltage Vmb and the state of charge SOCmb of the main battery 36 reach a full charge voltage Vmbfl and a full state of charge SOCmbf1) from the main ECU 50, the external power supply ECU 98 stops (terminates) control of the DC power supply device 92 to terminate the external DC charging. The main ECU 50 confirms that the external DC charging is terminated via the current sensor 36b or by communication with the external power supply ECU 98 and then switches off the system main relay SMR and the charging relay DCR.

Furthermore, in the electric vehicle 20 of the embodiment, when a permission is given to solar charging that charges the main battery 36 with electric power from the solar power generation system 60 and the state of charge SOCsb of the solar battery 61 is equal to or higher than a reference value SOCsb1 in the OFF state of the ignition switch 56, the solar ECU 70 determines that there is a need for solar charging and sends an ON request for the charging relay CHR to the main ECU 50. When receiving this request, the main ECU 50 switches on the charging relay CHR. In the connection process to switch on the charging relay CHR, the main ECU 50 switches on the positive electrode-side relay CHRB and the precharge relay CHRP to precharge (charge) the capacitor 38 and subsequently switches on the negative electrode-side relay CHRG and switches off the precharge relay CHRP. Switching on the positive electrode-side relay CHRB and the precharge relay CHRP forms a closed circuit by the positive electrode of the main battery 36, the positive electrode-side relay CHRB, the capacitor 38, the precharge relay CHRP, the precharge resistance R and the negative electrode of the main battery 36, so as to trigger precharge (charging) of the capacitor 38. The solar ECU 70 confirms that the charging relay CHR is ON via a voltage sensor (not shown) or by communication with the main ECU 50 and then controls the step-up DC/DC converter 64 to start the solar charging. When the state of charge SOCsb of the solar battery 61 becomes equal to or lower than a reference value SOCsb2 that is lower than the reference value SOCsb1 described above or when the solar ECU 70 receives information indicating that the main battery 36 is fully charged from the main ECU 50, the solar ECU 70 stops driving the step-up DC/DC converter 64 to terminate the solar charging. The main ECU 50 confirms that the solar charging is terminated via the current sensor 36b or by communication with the solar ECU 70 and then switches off the charging relay CHR.

Figure 2:
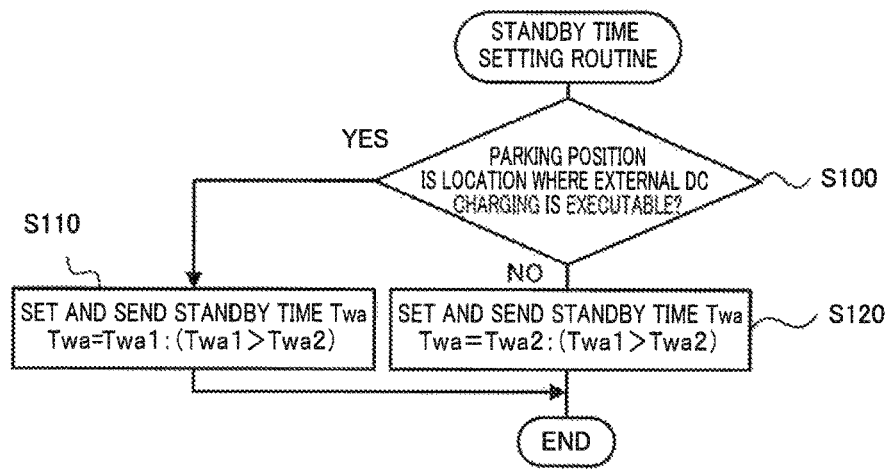
FIG. 2 is a flowchart showing one example of standby time setting routine performed by a main ECU.
Figure 3:
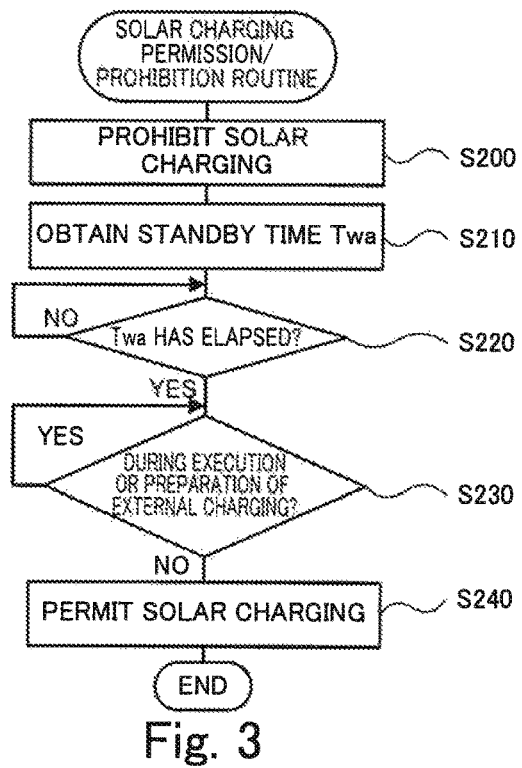
FIG. 3 is a flowchart showing one example of solar charging permission/prohibition routine performed by a solar ECU.

The following describes the operations of the electric vehicle 20 of the embodiment having the above configuration or more specifically a series of operations to permit or prohibit the solar charging that charges the main battery 36 with electric power from the solar power generation system 60. FIG. 2 is a flowchart showing one example of standby time setting routine performed by the main ECU 50, and FIG. 3 is a flowchart showing one example of solar charging permission/prohibition routine performed by the solar ECU 70. The standby time setting routine of FIG. 2 is triggered when the ignition switch 56 is turned off. The solar charging permission/prohibition routine is triggered by receiving a standby time Twa from the main ECU 50. The meaning of the standby time Twa will be described later. The following first describes the solar charging permission/prohibition routine of FIG. 3 and subsequently describes the standby time setting routine of FIG. 2.

When the solar charging permission/prohibition routine of FIG. 3 is triggered, the solar ECU 70 first prohibits the solar charging (step S200), obtains the standby time Twa input from the main ECU 50 (step S210), and waits for elapse of the standby time Twa since an OFF operation of the ignition switch 56 (step S220). When the standby time Twa has elapsed, the solar ECU 70 determines whether the present time is during execution or during preparation of the external DC charging (in the time duration from an operation of the charge start switch 99a to an actual start of the external DC charging) (step S230). When it is determined that the present time is during execution or during preparation of the external DC charging, the solar ECU 70 waits until it is determined that the present time is neither during execution nor during preparation of the external DC charging. When it is determined at step S230 that the present time is neither during execution nor during preparation of the external DC charging, the solar ECU 70 permits the solar charging (step S240) and terminates this routine. Even when the standby time Twa has elapsed since an OFF operation of the ignition switch 56, this configuration does not give permission for (i.e., continues prohibition of) the solar charging as long as the current moment is either during execution or during preparation of the external DC charging. This configuration accordingly avoids execution of the solar charging during execution or during preparation of the external DC charging.

When the standby time setting routine of FIG. 2 is triggered, the main ECU 50 determines whether the parking position of the vehicle is a location where the external DC charging is executable (step S100). For example, this determination may be implemented by determining whether the parking position of the vehicle is near to the external power supply apparatus 90 by the navigation system 57, based on the current location of the vehicle and the positions of charging stations in the map information.

When the parking position of the vehicle is a location where the external DC charging is executable, the main ECU 50 sets a relatively long predetermined time period Twa1 to the standby time Twa and sends the set standby time Twa to the solar ECU 70 (step S110) and then terminates this routine. When the parking position of the vehicle is not a location where the external DC charging is executable, on the other hand, the main ECU 50 sets a predetermined time period Twa2 shorter than the predetermined period Twa1 to the standby time Twa and sends the set standby time Twa to the solar ECU 70 (step S120) and then terminates this routine. It is preferable to set the predetermined time period Twa1 to a time period that is slightly longer than the time duration when external charging is likely to start after an OFF operation of the ignition switch 56. The predetermined time period Twa1 may be, for example, 9 minutes, 10 minutes or 11 minutes. The predetermined time period Twa2 may be, for example, 3 minutes, 4 minutes or 5 minutes. When the standby time Twa is sent from the main ECU 50 to the solar ECU 70, the solar ECU 70 prohibits the solar charging until the standby time Twa has elapsed since an OFF operation of the ignition switch 56, and permits the solar charging when the standby time Twa has elapsed as described above. In the state that permission is given for the solar charging, when the state of charge SOCsb of the solar battery 61 is equal to or higher than the reference value SOCsb1, the cooperative control of the main ECU 50 and the solar ECU 70 switches on the charging relay CHR to start the solar charging.

The following describes the reason why the standby time Twa is changed over according to whether the parking position of the vehicle is the location where the external DC charging is executable (near to the external power supply apparatus 90). When the parking position of the vehicle is the location where the external DC charging is executable, after an OFF operation of the ignition switch 56, the operator (for example, driver) is likely to connect the vehicle-side connector 44 with the power supply-side connector 94 and operate the charge start switch 99a. In the electric vehicle 20 of the embodiment, the precharge resistance R is shared by the system main relay SMR and the charging relay CHR. It is accordingly not allowed to perform the connection process of the charging relay CHR and the connection process of the system main relay SMR simultaneously (in parallel with each other). When the charge start switch 99a is operated during the connection process of the charging relay CHR (precharge), there is a need to switch off the positive electrode-side relay CHRB or the negative electrode-side relay CHRG of the charging relay CHR after completion of the connection process of the charging relay CHR and then perform the connection process of the system main relay SMR. This results in extending the time duration from an operation of the charge start switch 99a to completion of the connection process of the system main relay SMR and accordingly extending the time duration until a start of the external DC charging. In this case, the operator's operation of the charge start switch 99a is likely to be rejected (not to start the external DC charging) according to the specifications of the electric vehicle 20 and the external power supply apparatus 90. Starting the external DC charging during execution of the solar charging is also likely to cause a problem, for example, a failure in adequately controlling the charging electric power of the main battery 36. By taking into account the foregoing, the configuration of the embodiment sets the relatively long predetermined time period Twa1 to the standby time Twa when the parking position of the vehicle is the location where the external DC charging is executable. This configuration avoids an operation of the charge start switch 99a during the connection process of the charging relay CHR (precharge) and thereby suppresses an increase in time duration from an operation of the charge start switch 99a to completion of the connection process of the system main relay SMR. This configuration also suppresses the external DC charging from being started during execution of the solar charging. Additionally, this configuration allows for execution of the external charging when the driver gives an instruction to (desires to) perform the external charging during prohibition of the solar charging.

When the parking position of the vehicle is not the location where the external DC charging is executable, on the other hand, it is expected that external DC charging is not performed after an OFF operation of the ignition switch 56. Accordingly, the predetermined time period Twa2 shorter than the predetermined time period Twa1 is set to the standby time Twa. This further shortens the time duration from an OFF operation of the ignition switch 56 to a permission for the solar charging. This accordingly allows for execution of the solar charging in a shorter time period since an OFF operation of the ignition switch 56. The solar charging is actually performed, based on the state of charge SOCsb of the solar battery 61 as described above.

As described above, the electric vehicle 20 of the embodiment prohibits the solar charging until the standby time Twa has elapsed since an OFF operation of the ignition switch 56 and permits the solar charging when the standby time Twa has elapsed. This configuration suppresses the external DC charging from being started during execution of the solar charging. This configuration also allows for execution of the external DC charging when the driver gives an instruction to (desires to) perform the external DC charging during prohibition of the solar charging. Additionally, even after the standby time Twa has elapsed since an OFF operation of the ignition switch 56, this configuration does not give permission for (continues prohibition of) the solar charging during execution or during preparation of the external DC charging. This avoids execution of the solar charging during execution or during preparation of the external DC charging.

When the parking position of the vehicle is not the location where the external DC charging is executable on the occasion of an OFF operation of the ignition switch 56, the electric vehicle 20 of the embodiment sets a shorter time period to the standby time Twa, compared with the time period set when the parking position of the vehicle is the location where the external DC charging is executable. This configuration shortens the time duration from an OFF operation of the ignition switch 56 to a permission for the solar charging, when it is expected that the external DC charging is not performed after an OFF operation of the ignition switch 56. This accordingly allows for execution of the solar charging in a shorter time period since an OFF operation of the ignition switch 56.

When the parking position of the vehicle is not the location where the external DC charging is executable on the occasion of an OFF operation of the ignition switch 56, the electric vehicle 20 of the embodiment prohibits the solar charging until the predetermined time period Twa2 has elapsed and permits the solar charging when the predetermined time period Twa2 has elapsed. A modification may immediately permit the solar charging, i.e., may set value 0 to the predetermined time period Twa2.

The electric vehicle 20 of the embodiments sets the predetermined time period Twa1 to the standby time Twa when the parking position of the vehicle is the location where the external DC charging is executable on the occasion of an OFF operation of the ignition switch 56, while setting the predetermined time period Twa2 shorter than the predetermined time period Twa1 to the standby time Twa when the parking position of the vehicle is not the location where the external DC charging is executable. A modification may set the predetermined time period Twa1 to the standby time Twa, whether or not the parking position of the vehicle is the location where the external DC charging is executable.

Figure 4:
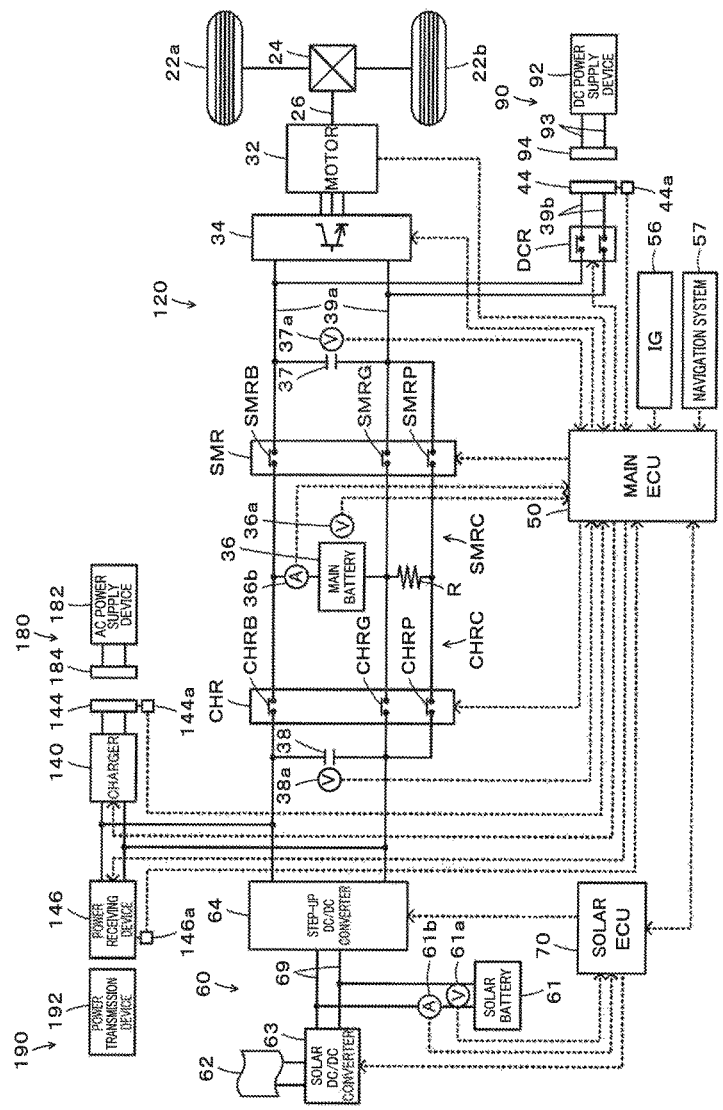
FIG. 4 is a configuration diagram illustrating the schematic configuration of an electric vehicle according to a modification.

The electric vehicle 20 of the embodiment is equipped with the main battery 36, the system main relay SMR, the charging relay CHR, the vehicle-side connector 44, the charging relay DCR and the solar power generation system 60 as shown in FIG. 1. An electric vehicle 120 according to a modification shown in FIG. 4 may be equipped with a charger 140, a vehicle-side connector 144 and a power receiving device 146, in addition to the configuration of the electric vehicle 20. In order to avoid the duplicated explanation, the like components of the electric vehicle 120 to those of the electric vehicle 20 are expressed by the like reference signs, and their detailed description is omitted.

In the electric vehicle 120, the charger 140 is placed between the charging relay CHR and the step-up DC/DC converter 64 of the solar power generation system 60 on the power lines 39a, and the vehicle-side connector 144 is connected with the charger 140. This vehicle-side connector 144 is configured to be connectable with a power supply-side connector 184 of an external power supply apparatus 180 at a charging point such as at home or at a charging station. The charger 140 is configured to perform external AC charging that charges the main battery 36 with electric power from an AC power supply device 182 of the external power supply apparatus 180 when the vehicle-side connector 144 is connected with the power supply-side connector 184 at a charging point such as at home or at a charging station. The AC power supply device 182 is configured as an AC power supply, such as a household power supply or an industrial power supply.

The power receiving device 146 is configured as a device that receives electric power in a contactless manner from a power transmission device 192 of an external power supply apparatus 190 at a charging point such as at home or at a charging station. This power receiving device 146 is configured to include a power receiving-side resonance circuit including a power receiving coil and a capacitor placed in the vicinity of, for example, the bottom of the vehicle body and connected in series; and a charging circuit configured to convert an AC power from the power receiving-side resonance circuit into a DC power and supply the DC power to the main battery 36-side. The power transmission device 192 is configured to include an AC power supply, such as a household power supply or an industrial power supply; a power transmission-side resonance circuit including a power transmission coil and a capacitor placed on, for example, a floor surface of the charging point and connected in series; and a frequency conversion circuit configured to adjust the frequency of an AC power from the AC power supply to a resonance frequency of the power transmission-side resonance circuit and supply the adjusted frequency to the power transmission-side resonance circuit.

For example, a connection detection signal from a connection detection sensor 144a mounted to the vehicle-side connector 144 and configured to detect the connection between the vehicle-side connector 144 and the power supply-side connector 184 of the external power supply apparatus 180 and an approach detection signal from an approach detection sensor 146a configured to detect an approach of the power receiving coil of the power receiving device 146 and the power transmission coil of the power transmission device 192 of the external power supply apparatus 190 to each other (to be approximately opposed to each other) are also input into the main ECU 50 via the input port. The approach detection sensor 146a may detect an approach of the power receiving coil and the power transmission coil to each other, for example, based on an image of the periphery of the electric vehicle 120 taken by a camera (not shown). For example, control signals to the charger 140 and control signals to the power receiving device 146 are also output from the main ECU 50 via the output port. The main ECU 50 is configured to communicate with electronic control units (not shown) of the external power supply apparatuses 90, 180 and 190. Each charging point may be provided with all the external power supply apparatuses 90, 180 and 190 or may be provided with one or two of the external power supply apparatuses 90, 180 and 190.

The electric vehicle 120 having the above configuration is capable of performing external AC charging that charges the main battery 36 with electric power from the AC power supply device 182 of the external power supply apparatus 180 and contactless external charging that causes the power receiving device 146 to receive electric power in a contactless manner from the power transmission device 192 of the external power supply apparatus 190 and then charges the main battery 36 with the received electric power, in addition to the external DC charging that charges the main battery 36 with electric power from the DC power supply device 92 of the external power supply apparatus 90. According to this modification, the main ECU 50 may perform a standby time setting routine of FIG. 5, in place of the standby time setting routine of FIG. 2 described above, and the solar ECU 70 may perform the solar charging permission/prohibition routine of FIG. 3 described above.

Figure 5:
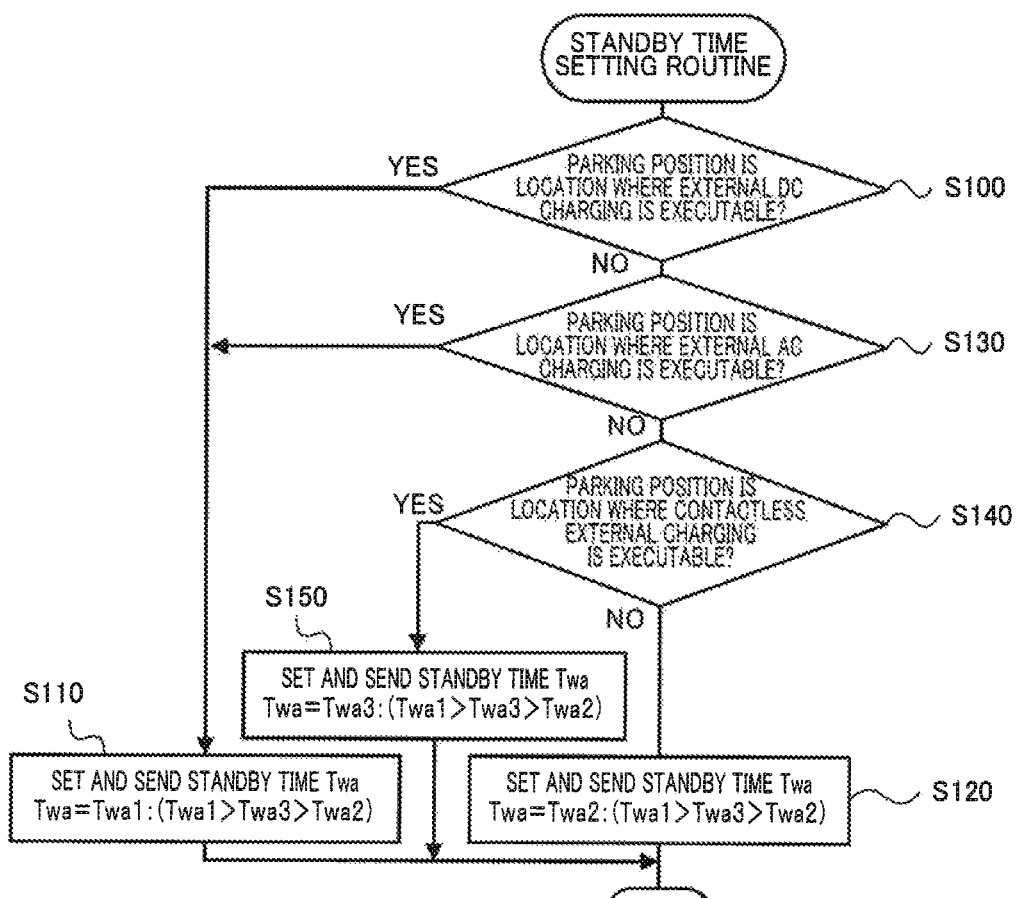
FIG. 5 is a flowchart showing one example of standby time setting routine according to the modification.

The following describes the standby time setting routine of FIG. 5. The standby time setting routine of FIG. 5 is similar to the standby time setting routine of FIG. 2, except addition of the processing of steps S130 to S150. The like processes are shown by the like step numbers, and their detailed description is omitted.

In the standby time setting routine FIG. 5, when the parking position of the vehicle is not a location where the external DC charging is executable at step S100, the main ECU 50 determines whether the parking position of the vehicle is a location where the external AC charging is executable (step S130). Like step S100, for example, this determination may be implemented by determining whether the parking position of the vehicle is near to the external power supply apparatus 180 by the navigation system 57, based on the current location of the vehicle and the positions of charging stations in the map information. When the parking position of the vehicle is a location where the external AC charging is executable, the main ECU 50 sets the predetermined time period Twa1 described above to the standby time Twa and sends the set standby time Twa to the solar ECU 70 (step S110) and then terminates this routine.

When the parking position of the vehicle is not a location where the external AC charging is executable at step S130, on the other hand, the main ECU 50 subsequently determines whether the parking position of the vehicle is a location where the contactless external charging is executable (step 140). For example, this determination may be implemented by determining whether the parking position of the vehicle is near to the external power supply apparatus 190 by the navigation system 57, based on the current location of the vehicle and the positions of charging stations in the map information or may be implemented by determining whether an approach of the power receiving coil of the power receiving device 146 and the power transmission coil of the power transmission device 192 of the external power supply apparatus 190 to each other (to be approximately opposed to each other) is detected by the approach detection sensor 146a. When the parking position of the vehicle is not a location where the contactless external charging is executable, i.e., when the parking position of the vehicle is a location where none of the external DC charging, the external AC charging and the contactless external charging is executable, the main ECU 50 sets the predetermined time period Twa2 described above to the standby time Twa and sends the set standby time Twa to the solar ECU 70 (step S120) and then terminates this routine.

When the parking position of the vehicle is a location where the contactless external charging is executable at step S140, i.e., when the parking position of the vehicle is a location where neither of the external DC charging and the external AC charging is executable but the contactless external charging is executable, the main ECU 50 sets a predetermined time period Twa3 that is shorter than the predetermined time period Twa1 but is longer than the predetermined time period Twa2 to the standby time Twa and sends the set standby time Twa to the solar ECU 70 (step S150) and then terminates this routine.

In general, the time duration when the contactless external charging is likely to start after an OFF operation of the ignition switch 56 is shorter than the time duration when the external DC charging or the external AC charging is likely to start after an OFF operation of the ignition switch 56. This is because there is simply a need to park the vehicle at a location where the contactless external charging is executable (i.e., there is no need to connect the vehicle-side connector with the power supply-side connector) in the former case. The configuration of this modification sets a shorter time period to the standby time Twa when the parking position of the vehicle is a location where neither of the external DC charging and the external AC charging is executable but the contactless external charging is executable, compared with the time period set when the parking position of the vehicle is a location where the external DC charging or the external AC charging is executable. This further shortens the time duration from an OFF operation of the ignition switch 56 to a permission for the solar charging. This accordingly allows for execution of the solar charging in a shorter time period since an OFF operation of the ignition switch 56. When the parking position of the vehicle is a location where the contactless external charging, as well as the external DC charging or the external AC charging is executable, the configuration of this modification sets not the predetermined time period Twa2 but the predetermined time period Twa1 to the standby time Twa, in order to suppress the external DC charging or the external AC charging from being started during execution of the solar charging.

When the parking position of the vehicle is a location where the external DC charging or the external AC charging is executable, this modification sets the predetermined time period Twa1 to the standby time Twa. According to another modification, different predetermined time periods may be set to the standby time Twa when the parking position of the vehicle is a location where the external DC charging is executable and when the parking position of the vehicle is a location where the external AC charging is executable.

This modification sets the predetermined time period Twa1 to the standby time Twa when the parking position of the vehicle is a location where the external DC charging or the external AC charging is executable, and sets the predetermined time period Twa3 shorter than the predetermined time period Twa1 to the standby time Twa when the parking position of the vehicle is a location where neither of the external DC charging and the external AC charging is executable but the contactless external charging is executable. According to another modification, the predetermined time period Twa1 may be set to the standby time Twa in any case.

The electric vehicle 20 of the embodiment is equipped with the vehicle-side connector 44, and the electric vehicle 120 of the modification is equipped with the vehicle-side connector 44, the charger 140, the vehicle-side connector 144 and the power receiving device 146. According to a modification, the electric vehicle may be equipped with only the charger 140 and the vehicle-side connector 144, may be equipped with only the power receiving device 146, may be equipped with the vehicle-side connector 44, the charger 140 and the vehicle-side connector 144, may be equipped with the vehicle-side connector 44 and the power receiving device 146 or may be equipped with the charger 140, the vehicle-side connector 144 and the power receiving device 146, out of the vehicle-side connector 44, the charger 140, the vehicle-side connector 144 and the power receiving device 146.

The electric vehicle 20 of the embodiment and the electric vehicle 120 of the modification are configured such that the motor 32 is connected with the driveshaft 26 coupled with the drive wheels 22a and 22b and that electric power is transmitted between the motor 32 and the main battery 36. The present disclosure may also be applicable to a hybrid vehicle configured such that a motor is connected with a driveshaft coupled with drive wheels, that an engine and a generator are additionally connected with the driveshaft via a planetary gear and that electric power is transmitted between the motor along with the generator and a main battery. The present disclosure may further be applicable to a hybrid vehicle configured such that a motor is connected via a transmission with a driveshaft coupled with drive wheels, that an engine is connected with the motor via a clutch and that electric power is transmitted between the motor and a main battery. The present disclosure may also be applicable to a series hybrid vehicle configured such that a motor is connected with a driveshaft coupled with drive wheels, that a generator is connected with an output shaft of an engine and that electric power is transmitted between the motor along with the generator and a main battery.

The electric vehicle 20 of the embodiment and the electric vehicle 120 of the modification use the main battery 36 as the power storage device but may use a capacitor instead.

In the electric vehicle 20 of the embodiment and the electric vehicle 120 of the modification, the precharge resistance R is shared by the precharge circuit SMRC of the system main relay SMR and the precharge circuit CHRC of the charging relay CHR. According to another modification, the precharge circuit SMRC and the precharge circuit CHRC may respectively include separate precharge resistances.

The electric vehicle 20 of the embodiment and the electric vehicle 120 of the modification are equipped with the main ECU 50 and the solar ECU 70. According to another modification, the main ECU 50 and the solar ECU 70 may be configured by a single electronic control unit.

In the vehicle of the above aspect, the control device may not permit the solar charging during execution or during preparation of the external charging, even when the standby time has elapsed since an off operation of the ignition switch. This configuration suppresses the solar charging from being started during execution or during preparation of the external charging.

The vehicle of the above aspect may further be a shorter time period is set to the standby time when a parking position of the vehicle is not a location where the external charging is executable, compared with a time period set when the parking position of the vehicle is a location where the external charging is executable. This configuration further shortens the time duration from an off operation of the ignition switch to a permission for the solar charging, when the parking position of the vehicle is not a location where the external charging is executable, i.e., when it is expected that the external charging is not performed after an off operation of the ignition switch.

In this case, the vehicle may include a vehicle-side connector connected with the power storage device and configured to be connectable with a power supply-side connector of the external power supply apparatus, and a power receiving device connected with the power storage device and configured to receive electric power in a contactless manner from a power transmission device of the external power supply apparatus. A shorter time period is set to the standby time when the parking position of the vehicle is a location where connected external charging that is the external charging with connection between the power supply-side connector and the vehicle-side connector is not executable but contactless external charging that is the external charging with non-contact power receiving and power transmission between the power transmission device and the power receiving device is executable, compared with a time period set when the parking position of the vehicle is a location where the connected external charging is executable. In general, the time duration when the contactless external charging is likely to start after an off operation of the ignition switch is shorter than the time duration when the connected external charging is likely to start after an off operation of the ignition switch. Setting the standby time in the above manner shortens the time duration from an off operation of the ignition switch to a permission for the solar charging, when the parking position of the vehicle is a location where the connected external charging is not executable but the contactless external charging is executable.

In the vehicle of the above aspect, the vehicle may include the control device may immediately permit the solar charging when a parking position of the vehicle is not a location where the external charging is executable. This configuration further shortens the time duration from an off operation of the ignition switch to a permission for the solar charging, when the parking position of the vehicle is not a location where the external charging is executable, i.e., when it is expected that the external charging is not performed after an off operation of the ignition switch.

In the vehicle of the above aspect, a vehicle-side connector connected with an inverter-side of the power storage device on a power line with which an inverter configured to drive the motor, the power storage device and the solar power generation system are connected in this sequence, and configured to be connectable with a power supply-side connector of the external power supply apparatus, a first relay provided between the power storage device and the inverter along with the vehicle-side connector on the power line, and a second relay provided between the power storage device and the solar power generation system on the power line. The control device may control the first relay and the second relay. In the configuration of this aspect, prohibiting the solar charging until elapse of the standby time since an off operation of the ignition switch as described above suppresses the connection process of the first relay and the connection process of the second relay from being performed simultaneously (in parallel with each other).

In this case, the vehicle may include a first capacitor mounted on an inverter along with vehicle-side connector-side of the first relay on the power line, a second capacitor mounted on a solar power generation system-side of the second relay on the power line. The first relay includes a first positive electrode-side relay provided on a positive electrode-side line of the power line, a first negative electrode-side relay provided on a negative electrode-side line of the power line, and a first precharge circuit including a precharge resistance and a first precharge relay that are connected in series such as to bypass the first negative electrode-side relay, and the second relay includes a second positive electrode-side relay provided on the positive electrode-side line, a second negative electrode-side relay provided on the negative electrode-side line, and a second precharge circuit including the precharge resistance shared with the first precharge circuit and a second precharge relay that are connected in series such as to bypass the second negative electrode-side relay. In a connection process to switch on the first relay, the control device may switch on the first positive electrode-side relay and the first precharge relay to precharge the first capacitor and subsequently switch on the first negative electrode-side relay and switch off the first precharge relay, and in a connection process to switch on the second relay, the control device may switch on the second positive electrode-side relay and the second precharge relay to precharge the second capacitor and subsequently switch on the second negative electrode-side relay and switch off the second precharge relay. In the configuration of this aspect, the precharge resistance is shared by the first precharge circuit and the second precharge circuit. It is accordingly not allowed to perform the connection process of the first relay and the connection process of the second relay simultaneously (in parallel with each other). When an instruction is given for execution of the external charging during the connection process of the second relay, there is a need to switch off the second positive electrode-side relay or the second negative electrode-side relay of the second relay after completion of the connection process of the second relay and subsequently perform the connection process of the first relay. This results in extending the time duration until completion of the connection process of the first relay and accordingly extending the time duration until a start of the external charging. In this case, there is a possibility that the external charging is not executed according to the specifications of the vehicle and the external power supply apparatus. The vehicle of this aspect prohibits the solar charging until elapse of the standby time since an off operation of the ignition switch as described above and thereby suppresses the occurrence of such inconvenience.

The following describes the correspondence relationship between the primary components of the embodiment and the primary components of the disclosure described in Summary. The main battery 36 of the embodiment corresponds to the "power storage device", the solar power generation system 60 corresponds to the "solar power generation system", and the main ECU 50 and solar ECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of vehicles.

What is claimed is:

1. A vehicle, comprising:
a power storage device configured to transmit electric power to and from a motor for driving;
a solar power generation system configured to generate electric power using sunlight and to perform solar charging that charges the power storage device with the generated electric power; and
a control device configured to control the solar power generation system,
the vehicle being configured to perform external charging that charges the power storage device with electric power from an external power supply apparatus, wherein
the control device prohibits the solar charging until a standby time has elapsed since an off operation of an ignition switch and permits the solar charging when the standby time has elapsed, and the control device does not permit the solar charging during execution or during preparation of the external charging, even when the standby time has elapsed since an off operation of the ignition switch.

2. The vehicle according to claim 1,
wherein a shorter time period is set to the standby time when a parking position of the vehicle is not a location where the external charging is executable, compared with a time period set when the parking position of the vehicle is a location where the external charging is executable.

3. The vehicle according to claim 2, further comprising:
a vehicle-side connector connected with the power storage device and configured to be connectable with a power supply-side connector of the external power supply apparatus; and
a power receiving device connected with the power storage device and configured to receive electric power in a contactless manner from a power transmission device of the external power supply apparatus, wherein
a shorter time period is set to the standby time when the parking position of the vehicle is a location where connected external charging that is the external charging with connection between the power supply-side connector and the vehicle-side connector is not executable but contactless external charging that is the external charging with non-contact power receiving and power transmission between the power transmission device and the power receiving device is executable, compared with a time period set when the parking position of the vehicle is a location where the connected external charging is executable.

4. The vehicle according to claim 1,
wherein the control device immediately permits the solar charging when a parking position of the vehicle is not a location where the external charging is executable.

5. The vehicle according to claim 1, further comprising:
a vehicle-side connector connected with an inverter-side of the power storage device on a power line with which an inverter configured to drive the motor, the power storage device and the solar power generation system are connected in this sequence, and configured to be connectable with a power supply-side connector of the external power supply apparatus;
a first relay provided between the power storage device and the inverter along with the vehicle-side connector on the power line; and
a second relay provided between the power storage device and the solar power generation system on the power line, wherein
the control device controls the first relay and the second relay.

6. The vehicle according to claim 5, further comprising:
a first capacitor mounted on an inverter along with vehicle-side connector-side of the first relay on the power line;
a second capacitor mounted on a solar power generation system-side of the second relay on the power line, wherein
the first relay includes a first positive electrode-side relay provided on a positive electrode-side line of the power line, a first negative electrode-side relay provided on a negative electrode-side line of the power line, and a first precharge circuit including a precharge resistance and a first precharge relay that are connected in series such as to bypass the first negative electrode-side relay, and
the second relay includes a second positive electrode-side relay provided on the positive electrode-side line, a second negative electrode-side relay provided on the negative electrode-side line, and a second precharge circuit including the precharge resistance shared with the first precharge circuit and a second precharge relay that are connected in series such as to bypass the second negative electrode-side relay, wherein
in a connection process to switch on the first relay, the control device switches on the first positive electrode-side relay and the first precharge relay to precharge the first capacitor and subsequently switches on the first negative electrode-side relay and switches off the first precharge relay, and
in a connection process to switch on the second relay, the control device switches on the second positive electrode-side relay and the second precharge relay to precharge the second capacitor and subsequently switches on the second negative electrode-side relay and switches off the second precharge relay.

\* \* \* \* \*